US012652608B2

(12) United States Patent
Hong et al.

(10) Patent No.: US 12,652,608 B2
(45) Date of Patent: Jun. 9, 2026

(54) INFORMATION DETERMINATION METHOD AND APPARATUS, AND TERMINAL

(71) Applicant: VIVO MOBILE COMMUNICATION CO., LTD., Dongguan (CN)

(72) Inventors: Qi Hong, Dongguan (CN); Gen Li, Dongguan (CN); Siqi Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 328 days.

(21) Appl. No.: 18/374,644

(22) Filed: Sep. 28, 2023

(65) Prior Publication Data

US 2024/0031916 A1     Jan. 25, 2024

Related U.S. Application Data

(63) Continuation of application No. PCT/CN2022/084514, filed on Mar. 31, 2022.

(30) Foreign Application Priority Data

Apr. 2, 2021     (CN) .......................... 202110362310.8

(51) Int. Cl.
| | |
|---|---|
| *H04W 4/40* | (2018.01) |
| *H04L 5/00* | (2006.01) |
| *H04W 48/08* | (2009.01) |

(52) U.S. Cl.
CPC ........... *H04W 48/08* (2013.01); *H04L 5/0051* (2013.01)

(58) Field of Classification Search
CPC ..... H04W 48/08; H04W 48/12; H04W 76/27; H04L 5/0051; H04L 5/0048; H04L 5/00; H04L 5/0053; H04L 5/0078; H04L 5/0094

(Continued)

(56) References Cited

U.S. PATENT DOCUMENTS

| | | | |
|---|---|---|---|
| 9,699,663 B1 | 7/2017 | Jovancevic | |
| 2020/0304260 A1* | 9/2020 | Si | H04W 48/12 |

(Continued)

FOREIGN PATENT DOCUMENTS

| | | |
|---|---|---|
| CN | 108886462 A | 11/2018 |
| CN | 109428693 A | 3/2019 |

(Continued)

OTHER PUBLICATIONS

R1-2102238; Summary of # 5 of email discussion on initial access aspect of NR extension upto 71GHz, Feb. 2020 (Year: 2020).*

(Continued)

*Primary Examiner* — Tanmay K Shah

(74) *Attorney, Agent, or Firm* — IPX PLLC

(57) ABSTRACT

An information determination method and a terminal are provided. The information determination method includes: acquiring third information by a terminal, and determining, by the terminal, an actually sent Synchronization Signal and PBCH Block (SSB) according to the third information. The third information comprises at least one of the following: a value of a Quasi Co-Location (QCL) parameter Q, a Discover Burst Transmission Window (DBTW) configuration, or an SSB position indication field. The SSB position indication field comprises a second indication field and a third indication field. The second indication field is used for indicating whether candidate SSB groups are actually sent, and the third indication field is used for indicating actually sent SSBs in each candidate SSB group.

18 Claims, 5 Drawing Sheets

(58) Field of Classification Search
    USPC ..................................................... 455/422.1
    See application file for complete search history.

(56)                    References Cited

U.S. PATENT DOCUMENTS

| | | |
|---|---|---|
| 2020/0389860 A1 | 12/2020 | Tang |
| 2021/0076391 A1 | 3/2021 | Davydov et al. |

FOREIGN PATENT DOCUMENTS

| | | |
|---|---|---|
| CN | 110381588 A | 10/2019 |
| CN | 111130716 A | 5/2020 |
| CN | 112514293 A | 3/2021 |
| WO | 2019127466 A1 | 7/2019 |
| WO | 2020118717 A1 | 6/2020 |
| WO | 2020200096 A1 | 10/2020 |
| WO | 2021027820 A1 | 2/2021 |

OTHER PUBLICATIONS

International Search Report issued in corresponding International Application No. PCT/CN2022/084514, mailed Jun. 22, 2022, 4 pages.

Moderator, "Summary #5 of email discussion on initial access aspect of NR extension up to 71 Ghz", 3GPP tsg_ran\wg1_rl1, R1-2102238, Feb. 2021, 199 pages.

Zte et al, "Enhancement of the initial access procedure", 3GPP tsg_ran\wg1_rl1, R1-1905952, May 2019, 15 pages.

Extended European Search Report issued in related European Application No. 22779089.6, mailed Jul. 15, 2024, 9 pages.

First Office Action issued in related Chinese Application No. 202110362310.8, mailed Aug. 24, 2023, 10 pages.

Second Office Action issued in related Chinese Application No. 202110362310.8, mailed Mar. 30, 2024, 11 pages.

LG Electronics, "Remaining issues on SS block design and indication method", 3GPP tsg_ran\WG1_RL1, R1-1713121, Aug. 2017, 8 pages.

Qualcomm "Status report for WI NR-based access to unlicensed spectrum; " 3GPP tsg_ran\tsg_ran,tsgr_83, RP-190240, Mar. 2019, 24 pages.

Huiying Jiao et al, "5G massive MIMO enhancement technology and development", Mobile Communications vol. 04, Apr. 2020.

* cited by examiner

Network side device

11

11

Terminal

Terminal

Acquire an SSB by a terminal                                    21

Determine, by the terminal, whether a DBTW exists according to first
information and/or RRC signaling                                22

Acquire third information by a terminal

Determine, by the terminal, an actually sent SSB according to the third information Information determination apparatus First acquiring module First determining module

INFORMATION DETERMINATION METHOD AND APPARATUS, AND TERMINAL

CROSS-REFERENCE TO RELATED APPLICATIONS

This application is a continuation of International Application No. PCT/CN2022/084514, filed on Mar. 31, 2022, which claims the priority to Chinese Patent Application No. 202110362310.8 filed on Apr. 2, 2021. The entire contents of each of the above-referenced applications are expressly incorporated herein by reference.

TECHNICAL FIELD

This application belongs to the technical field of communications, and particularly relates to an information determination method and apparatus, and a terminal.

BACKGROUND

In order to adapt to transmission on an un-licensed frequency band, a Discover Burst Transmission Window (DBTW) mechanism is introduced at present. However, for communications systems, in existing frequency bands, some frequency bands are licensed frequency bands, some frequency bands are un-licensed frequency bands, and even some frequency bands are classified as licensed frequency bands in some countries and un-licensed frequency bands in some other countries. Therefore, how to determine whether a DBTW exists is an urgent issue that needs to be solved.

SUMMARY

Embodiments of this application provide an information determination method and apparatus, and a terminal.

In a first aspect, an information determination method is provided and applied to a terminal, and includes:

acquiring a Synchronization Signal and PBCH Block (SSB) by the terminal, and determining, by the terminal, whether a DBTW exists according to first information and/or Radio Resource Control (RRC) signaling, wherein, the first information includes at least one of the following:

frequency band information of the SSB;

system information of the SSB;

sequence information of the SSB; and a Sub-Carrier Space (SCS) of the SSB.

In a second aspect, an information determination method is provided and applied to a terminal, and includes:

acquiring third information by the terminal; and determining, by the terminal, an actually sent SSB according to the third information;

wherein, the third information includes at least one of the following a value of a Quasi Co-Location (QCL) parameter Q, a DBTW configuration, and an SSB position indication field;

wherein, the SSB position indication field includes a second indication field and a third indication field; the second indication field is used for indicating whether candidate SSB groups are actually sent; and the third indication field is used for indicating actually sent SSBs in each candidate SSB group.

In a third aspect, an information determination apparatus is provided and applied to a terminal, and includes:

a first acquiring module, configured to acquire an SSB; and a first determining module, configured to determine whether a DBTW exists according to first information and/or RRC signaling, wherein, the first information includes at least one of the following:

frequency band information of the SSB;

system information of the SSB;

sequence information of the SSB; and an SCS of the SSB.

In a fourth aspect, an information determination apparatus is provided and applied to a terminal, and includes:

a second acquiring module, configured to acquire third information; and a second determining module, configured to determine an actually sent SSB according to the third information;

wherein, the third information includes at least one of the following: a value of a QCL parameter Q, a DBTW configuration, and an SSB position indication field;

wherein, the SSB position indication field includes a second indication field and a third indication field; the second indication field is used for indicating whether candidate SSB groups are actually sent, and the third indication field is used for indicating actually sent SSBs in each candidate SSB group.

In a fifth aspect, a terminal is provided and includes a processor, a memory, and a program or instruction stored on the memory and capable of running on the processor, and the program or instruction, when executed by the processor, implements steps of the method as described in the first aspect, or implements steps of the method as described in the second aspect.

In a sixth aspect, a terminal is provided and includes: a processor and a communication interface, and the processor is configured to acquire an SSB, and determine whether a DBTW exists according to first information and/or RRC signaling; the first information includes at least one of the following: frequency band information of the SSB, system information in the SSB, sequence information of the SSB, and an SCS of the SSB; or, the processor is configured to acquire third information, and determine an actually sent SSB according to the third information; the third information includes at least one of the following: a value of a QCL parameter Q, a DBTW configuration, and an SSB position indication field; the SSB position indication field includes a second indication field and a third indication field; the second indication field is used for indicating whether candidate SSB groups are actually sent; and the third indication field is used for indicating actually sent SSBs in each candidate SSB group.

In a seventh aspect, a readable storage medium is provided, and stores a program or instruction, and the program or instruction, when executed by a processor, implements steps of the method as described in the first aspect, or implements steps of the method as described in the second aspect.

In an eighth aspect, a chip is provided, and includes a processor and a communication interface, the communication interface is coupled to the processor, and the processor is configured to run a program or instruction to implement steps of the method as described in the first aspect, or implements steps of the method as described in the second aspect.

In a ninth aspect, a computer program/program product is provided and stored in a storage medium, and the computer program/program product, when executed by at least one processor, implements steps of the method as described in the first aspect, or implements steps of the method as described in the second aspect.

Ina tenth aspect, a terminal is provided and configured to execute steps of the method as described in the first aspect, or configured to execute steps of the method as described in the second aspect.

In the embodiments of this application, after acquiring the SSB, the terminal may determine whether the DBTW exists according to the first information and/or the RRC signaling, and the first information includes at least one of the following: the frequency band information of the SSB, the system information in the SSB, the sequence information of the SSB, and the SCS of the SSB, so as to determine that the DBTW exists or the DBTW does not exist.

DETAILED DESCRIPTION

Technical solutions in embodiments of this application are clearly described in the following with reference to accompanying drawings in the embodiments of this application. Apparently, the described embodiments are merely some rather than all of the embodiments of this application. All other embodiments obtained by a person skilled in the art based on the embodiments of this application fall within the protection scope of this application.

Terms "first". "second", etc. in the specification and claims of this application are used to distinguish similar objects, but are unnecessarily used to describe a specific sequence or order. It is to be understood that terms used in this way are exchangeable in a proper case, so that the embodiments of this application can be implemented in an order other than those illustrated or described here. The objects distinguished by "first" and "second" are usually of the same class, and the number of the objects is not limited. For example, there may be one or a plurality of first objects. In addition, "and/or" used in this specification and the claims represents at least one of the connected objects, and the character "/" generally indicates that associated objects in front of and behind it are in an "or" relationship.

It is worth noting that the technologies described in the embodiments of this application are not limited to a Long Term Evolution (LTE)/LTE-Advanced (LTE-A) system, and may further be applied to other wireless communication systems, such as Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA), and other systems. The terms "system" and "network" in the embodiments of this application are often interchangeably used, and the technologies may be applied to the systems and radio technologies mentioned above, and may also be applied to other systems and radio technologies. The following description describes a New Radio (NR) system for example objectives, and the NR terms are used in most of the following descriptions. However, these technologies may also be applied to applications other than NR system applications, such as a 6th Generation (6G) communication system.

Figure 1:
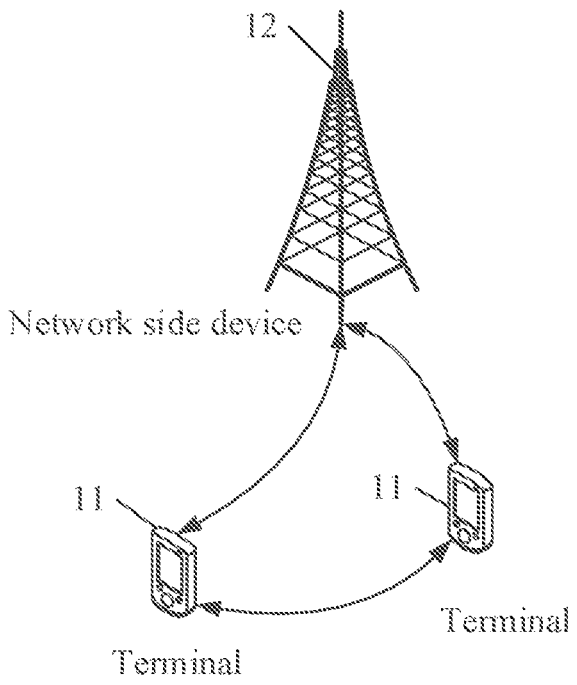
FIG. 1 is a structural diagram of a wireless communication system according to an embodiment of this application.

FIG. 1 shows a structural diagram of a wireless communication system to which an embodiment of this application is applicable. The wireless communication system includes a terminal 11 and a network side device 12. The terminal 11 may also be called a terminal device or User Equipment (UE), the terminal 11 may be a mobile phone, a tablet computer, and a laptop computer, or called a laptop, a Personal Digital Assistant (PDA), a palmtop, a netbook, an Ultra-Mobile Personal Computer (UMPC), a Mobile Internet Device (MID), a wearable device, or terminal side devices such as Vehicle UE (VUE) and Pedestrian UE (PUE) The wearable device includes, a smart watch, a bracelet, a headphone, glasses and the like. It needs to be noted that, the specific type of the terminal 11 is not limited in the embodiments of this application. The network side device 12 may be a base station or a core network, the base station may be called a node B, an evolution node B, an access point, a Base Transceiver Station (BTS), a radio transceiver, a Basic Service Set (BSS), an Extended Service Set (ESS), a B node, an evolution 13 node (eNB), a home B node, a home evolution B node, a Wireless Local Area Network (WLAN) access point, a Wireless Fidelity (WiFi) node, a Transmission Reception Point (TRP) or another suitable term in the field, and as long as the same technical effects are achieved, the base station is not limited to specific technical vocabulary. It needs to be noted that, merely a base station in the NR system is used as an example in the embodiments of this application, but a specific type of the base station is not limited.

In order to facilitate the understanding of the embodiments of this application, the following content is explained first.

In the embodiments of this application, an SSB may be sent in a way of a beam. Due to the narrow beam, the same SSBs may be sent to different directions in a form of the beam in a way of Time Division Duplexing (TDD), so that UE in each direction may receive the SSBs. A series of SSBs sent by the base station to various directions within a preset time, such as 5 ms, may be called a Synchronization Signal (SS) burst set A repetition period of the SS burst set is an SS Burst Set period. The maximum number of SSBs supported within an SS Burst Set is not the same and may be changed depending on a frequency. Since the higher the frequency is, the greater the loss is, the greater the frequency where the SS Burst Set is located is, the greater the maximum number of the SSBs it can support.

Not all SSBs in an SS Burst Set must be set, an index of an actually sent SSB may be identified by an SSB position indication field, such as ssb-PositionsInBurst in a System Information Block (SIB) 1. For a 64-beam sending method, ssb-PositionsInBurst uses 16 bits in the SIB1 for indication, including a groupPresence indication field and an inOne-eGroup indication field, the groupPresence indication field is used for indicating whether to send every 8 successive SSBs (one group), that is, a first bit represents SSB 0-7, a second bit represents SSB 8-15, and so on. The inOneGroup indication field is used for indicating which SSBs in one group to send, the first bit indicates SSB 0, 8, . . . , the second bit indicates SSB 1, 9, . . . , and so on.

In some embodiments, for the DBTW, a size of the DBTW may be configured through a DiscoveryBurst-Win-dowLength parameter in the SIB1, for example, it may be selected as 0.5 ns, 1 ms, 2 ms, 3 ms, 4 ms or 5 ms; and if the parameter is not configured, the default size of the DBTW may be a half-frame, namely 5 ms. The SSBs distributed in different DBTWs also have a certain QCL relationship. For this, a QCL parameter Q is defined. Assuming that a Demodulation Reference Signal (DMRS) sequence index corresponding to a Physical Broadcast Channel (PBCH) is A, for different SSBs, if results of modular calculation performed by A on Q are the same, it may be considered that the different SSBs have the QCL relationship.

An information determination method provided by an embodiment of this application is described in detail through some embodiments and their application scenarios in the following with reference to the accompanying drawings.

Figure 2:
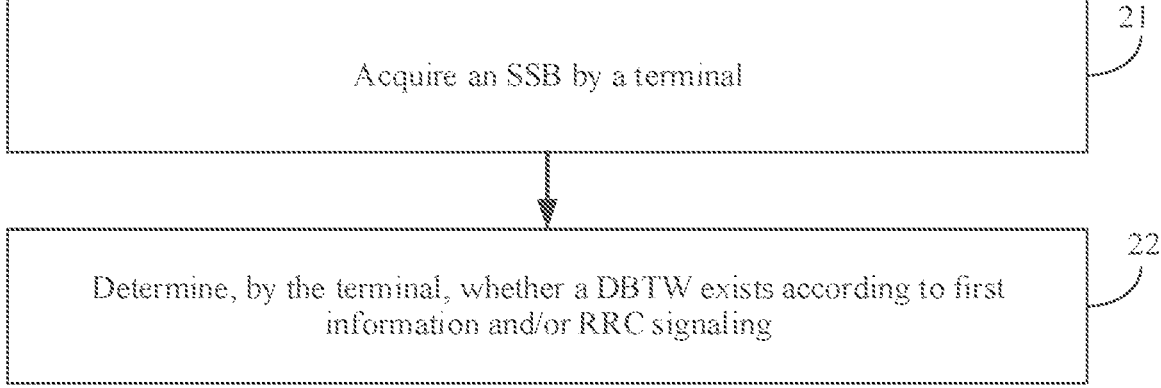
FIG. 2 is a flowchart of an information determination method according to an embodiment of this application.

Please refer to FIG. 2, FIG. 2 is a flowchart of an information determination method provided by an embodiment of this application. The method is executed by a terminal. As shown in FIG. 2, the method includes the following steps:

step 21, the terminal acquires an SSB.

In this embodiment, the terminal needs to perform initial search when starting up or performing cell switching, and at this time, the SSB may be acquired, so as to obtain downlink synchronization of a cell.

Step 22, the terminal determines whether a DBTW exists according to first information and/or RRC signaling.

In this embodiment, the first information may include at least one of the following:

frequency band information of the SSB;

system information of the SSB;

sequence information of the SSB; and an SCS of SSB.

It may be understood that the above RRC signaling may be acquired from a network side terminal after the terminal acquires the SSB.

In the information determination method of this embodiment of this application, after acquiring the SSB, the terminal may determine whether the DBTW exists according to the first information and/or the RRC signaling, and the first information includes at least one of the following: the frequency band information of the SSB, the system information in the SSB, the sequence information of the SSB, and the SCS of the SSB, so as to determine that the DBTW exists or the DBTW does not exist.

In some embodiments, the above frequency band information of the SSB may include at least one of the following:

1) a frequency band range where the SSB is located, 2) a raster where the SSB is located, and 3) a frequency position where the SSB is located.

For example, if the frequency band range where the SSB is located is a licensed frequency band, it may be determined that the DBTW does not exist, and if the frequency band range where the SSB is located is an unlicensed frequency band, it may be determined that the DBTW exists. Or, if the frequency band range where the SSB is located is a licensed frequency band, it may be determined that the DBTW exists, and if the frequency band range where the SSB is located is an unlicensed frequency band, it may be determined that the DBTW does not exist.

For another example, if the frequency band range where the SSB is located is an unlicensed frequency band, and the raster where the SSB is located is a specific sync raster number or the frequency position where the SSB is located is a specific frequency position, it may be determined that the DBTW exists Otherwise, it is determined that the DBTW does not exist.

For yet another example, for the licensed frequency band and the unlicensed frequency band, different rasters or frequency positions may be defined to indicate existence or inexistence of the DBTW. If UE detects the required SSB on the raster of the unlicensed frequency band when performing blind detection, it is defaulted that the DBTW exists Or, if the UE detects the required SSB on the raster of the licensed frequency band when performing blind detection, it is defaulted that the DBTW exists. Or, if the UE detects the required SSB on the frequency position of the unlicensed frequency band when performing blind detection, it is defaulted that the DBTW exists. Or, if the UE detects the required SSB on the frequency position of the licensed frequency band when performing blind detection, it is defaulted that the DBTW exists.

In some embodiments, the above system information may include a first indication field, the first indication field is used for indicating existence or inexistence of the DBTW, and the first indication field may include, but is not limited to at least one of the following:

1) a sub-carrier spacing indication field in the SSB.

For example, the sub-carrier spacing indication field is subCarrierSpacingCommon of a PBCH in the SSB, that is, subCarrierSpacingCommon of the PBCH in the SSB is multiplexed to indicate existence or inexistence of the DBTW. In this case, it may set an SCS of an initial BWP to have a fixed scaling relationship with the SCS of the SSB, so as to determine an SCS of the initial BWP according to the SCS of the SSB, so that it is unnecessary to use subCarrierSpacingCommon of the PBCH in the SSB to indicate the SCS of the initial BWP.

2) A Physical Downlink Shared Channel (PDSCH)-DMRS position indication field in the SSB.

For example, the PDSCH-DMRS indication field is a PDSCH-DMRS position indication field of the PBCH in the SSB, that is, the PDSCH-DMRS position indication field of the PBCH in the SSB is multiplexed to indicate existence or inexistence of the DBTW. In this case, it may set the PDSCH-DMRS position indication field to have a fixed scaling relationship with the SSB SCS, for example, one SSB SCS corresponds to one PDSCH-DMRS position, so as to determine the PDSCH-DMPS position according to the SSB SCS, or there is no relationship between the PDSCH-DMRS position indication field and the SSB SCS, but the PDSCH-DMRS position is fixed, so that it is unnecessary to use the PDSCH-DMRS position indication field of the PBCH in the SSB to indicate the PDSCH-DMRS position.

3) Part or all of bit fields in a Physical Downlink Control Channel (PDCCH) configuration system information block indication field in the SSB.

For example, the PDCCH configuration system information block indication field is a pdcch-ConfigSIB1 of the PBCH in the SSB, that is, the pdcch-ConfigSIB1 of the PBCH in the SSB is multiplexed to indicate existence or inexistence of the DBTW. In this case, the number of effective entries in a configuration table of a Control resource set (Coreset) #0 and/or a configuration table of a Search space #0 may be set to decrease, so as to use at least part of the bits in the pdcch-ConfigSIB1 of the PBCH in the SSB to indicate existence or inexistence of the DBTW.

4) Part of bit fields in an SSB sub-carrier offset indication field in the SSB.

For example, the SSB sub-carrier offset indication field is ssb-SubcarrierOffset of the PBCH in the SSB, that is, ssb-SubcarrierOffset of the PBCH in the SSB is multiplexed to indicate existence or inexistence of the DBTW. In this case, a Least Significant Bit (LSB) in the ssb-Subcarrier-Offset of the PBCH in the SSB may be multiplexed to indicate existence or inexistence of the DBTW.

5) A reserved indication field in the SSB. For example, the reserved indication field is a reserved indication field of the PBCH in the SSB, and is used for indicating existence or inexistence of the DBTW.

6) A newly added indication field in the SSB. For example, the newly added indication field is an additional indication field added in the SSB, and is used for indicating existence or inexistence of the DBTW For example, in order to determine whether the DBTW exists, in this embodiment, a sequence design of the SSB when the DBTW exists may be predefined by a protocol or pre-configured by a network to be different from a sequence design of the SSB when the DBTW does not exist, so as to directly determine whether the DBTW exists according to the sequence design of the SSB. The above sequence information of the SSB may include at least one of the following:

1) A Time Field Position Relationship Between a Primary Synchronization Signal (PSS) and a Secondary Synchronization Signal (SSS) in the SSB.

For example, it is assumed that in predefinition of the protocol or pre-configuration of the network, the DBTW exists when the time field position relationship between the PSS and the SSS in the SSB is A, and otherwise, the DBTW does not exist, then; if a time field position relationship acquired by the UE between the PSS and the SSS in the SSB is A, it may be determined that the DBTW exists; and if the time field position relationship acquired by the UE between the PSS and the SSS in the SSB is not A, it may be determined that the DBTW does not exist.

2) A Frequency Field Position Relationship Between the PSS and the SSS in the SSB.

For example, it is assumed that in predefinition of the protocol or pre-configuration of the network, the DBTW exists when the frequency field position relationship between the PSS and the SSS in the SSB is B. and otherwise, the DBTW does not exist, then: if a frequency field position relationship acquired by the UE between the PSS and the SSS in the SSB is B, it may be determined that the DBTW exists; and if the frequency field position relationship acquired by the UE between the PSS and the SSS in the SSB is not B, it may be determined that the DBTW does not exist.

3) A Phase Difference or Cyclic Shift Between the PSS and the SSS in the SSB.

For example, it is assumed that in predefinition of the protocol or pre-configuration of the network, the DBTW exists when the phase difference or cyclic shift between the PSS and the SSS in the SSB is C, and otherwise, the DBTW does not exist, then: if a phase difference or cyclic shift acquired by the UE between the PSS and the SSS in the SSB is C, it may be determined that the DBTW exists; and if the phase difference or cyclic shift acquired by the UE between the PSS and the SSS in the SSB is not C, it may be determined that the DBTW does not exist.

4) A Phase Difference or Cyclic Shift of the PSS in the SSB

For example, it is assumed that in predefinition of the protocol or pre-configuration of the network, the DBTW exists when the phase difference or cyclic shift of the PSS in the SSB is D, and otherwise, the DBTW does not exist, then: if a phase difference or cyclic shift acquired by the UE of the PSS in the SSB is D, it may be determined that the DBTW exists; and if the phase difference or cyclic shift acquired by the UE of the PSS in the SSB is not D, it may be determined that the DBTW does not exist.

5) A Phase Difference or Cyclic Shift of the SSS in the SSB.

For example, it is assumed that in predefinition of the protocol or pre-configuration of the network, the DBTW exists when the phase difference or cyclic shift of the SSS in the SSB is E, and otherwise, the DBTW does not exist, then, if a phase difference or cyclic shift acquired by the UE of the SSS in the SSB is E, it may be determined that the DBTW exists; and if the phase difference or cyclic shift acquired by the UE of the SSS in the SSB is not E, it may be determined that the DBTW does not exist.

6) A Sequence of the PSS and/or the SSS in the SSB.

For example, it is assumed that in predefinition of the protocol or pre-configuration of the network, the DBTW exists when the sequence of the PSS and/or the SSS in the SSB is F, and otherwise, the DBTW does not exist, then: if a sequence acquired by the UE of the PSS and/or the SSS in the SSB is F, it may be determined that the DBTW exists, and if the sequence acquired by the UE of the PSS and/or the SSS in the SSB is not F, it may be determined that the DBTW does not exist.

7) A Phase Difference or Cyclic Shift of the DMRS of the PBCH in the SSB.

For example, it is assumed that in predefinition of the protocol or pre-configuration of the network, the DBTW exists when the phase difference or cyclic shift of the DMRS of the PBCH in the SSB is G, and otherwise, the DBTW does not exist, then: if a phase difference or cyclic shift acquired by the UE of the DMRS of the PBCH in the SSB is G, it may be determined that the DBTW exists; and if the phase difference or cyclic shift acquired by the UE of the DMRS of the PBCH in the SSB is not G, it may be determined that the DBTW does not exist.

It needs to be pointed that forms of the above A, B, C, D, E, F and G may be selected according to actual demands, which is not limited in this embodiment.

In some embodiments, when the terminal determines whether the DBTW exists according to the SCS of the SSB, it may be determined that the DBTW exists in a case that the SCS of the SSB is a first SCS; or, it is determined that the DBTW does not exist in a case that the SCS of the SSB is not the first SCS. The first SCS may be predefined by the protocol or pre-configured by the network That is to say, for the SCS of the SSB, it may be defaulted that when there are some SCSs, the DBTW exists, while others not. For example, when the SCS of the SSB is equal to 480 K or 960 K, it is defaulted that the DBTW exists, and when the SCS of the SSB is equal to 120 K, the DBTW does not exist.

In this embodiment of this application, in a case of determining that the DBTW exists, the terminal may determine a size of the DBTW according to the system information and/or the RRC signaling.

In some embodiments, the size of the DBTW may be configured with slot as a basic unit. For example, for configuring the size of the DBTW with the slot as the basic unit, the slot may be taken as the basic unit when DiscoveryBurst-WindowLength is used for configuring the size of the DBTW, for example, it may be 5 slots, 10 slots, 20 slots or the like.

In some embodiments, the size of the DBTW may be configured in a scaling form according to the SCS and a size of a default DBTW. For example, the size of the default DBTW may be firstly set, for example, when a default SCS is equal to 120 K, the size of the default DBTW may be configured as 0.5 ms, 1 ms or 2 ms, and when the SCS is equal to 480 K, since 480 K is 4 times 120 K, the size of the corresponding DBTW is 0.125 ms, 0.25 ms or 0.5 ms.

In some embodiments, in a case of determining that the DBTW exists, the maximum number of candidate SSB indexes is a*L; wherein, L is the maximum number of the candidate SSB indexes in a case that the DBTW does not exist; and a is an expansion factor. That is to say, if it is configured that the DBTW exists, the maximum number of the candidate SSB indexes at this time may be expanded from L to a*L. For example, L is equal to 64 and the like.

In some embodiments, above a may be any one of the following:

a predefined value; for example, a may be predefined as 1.5, 2 and the like.

a value determined according to the SCS of the SSB and/or a pattern of the SSB; and for example, the values of a under different SCSs and/or patterns may be predefined by the protocol or pre-configured by the network, so as to directly determine the corresponding values of a according to the SCSs and/or patterns of the SSB.

In some embodiments, in a case of expanding the maximum number of the candidate SSB indexes, the candidate SSB indexes may be determined through a candidate SSB index indication field and at least one of the following:

1) a sub-carrier spacing indication field in the SSB

For example, the sub-carrier spacing indication field is subCarrierSpacingCommon of a PBCH in the SSB, that is, subCarrierSpacingCommon of the PBCH in the SSB is multiplexed to indicate the candidate SSB indexes. In this case, it may set an SCS of an initial BWP to have a fixed scaling relationship with the SCS of the SSB, so as to determine an SCS of the initial BWP according to the SCS of the SSB, so that it is unnecessary to use subCarrierSpacingCommon of the PBCH in the SSB to indicate the SCS of the initial BWP.

2) A PDSCH-DMRS position indication field in the SSB

For example, the PDSCH-DMRS indication field is a PDSCH-DMRS position indication field of the PBCH in the SSB, that is, the PDSCH-DMRS position indication field of the PBCH in the SSB is multiplexed to indicate the candidate SSB indexes. In this case, it may set the PDSCH-DMRS position indication field to have a fixed scaling relationship with the SSB SCS, for example, one SSB SCS corresponds to one PDSCH-DMRS position, so as to determine the PDSCH-DMPS position according to the SSB SCS, or there is no relationship between the PDSCH-DMRS position indication field and the SSB SCS, but the PDSCH-DMRS position is fixed, so that it is unnecessary to use the PDSCH-DMRS position indication field of the PBCH in the SSB to indicate the PDSCH-DMRS position.

3) Part or all of bit fields in a PDCCH configuration system information block indication field in the SSB.

For example, the PDCCH configuration system information block indication field is a pdcch-ConfigSIB1 of the PBCH in the SSB, that is, the pdcch-ConfigSIB1 of the PBCH in the SSB is multiplexed to indicate the candidate SSB indexes. In this case, the number of effective entries in a configuration table of a Coreset #0 and/or a configuration table of a Search space #0 may be set to decrease, so as to use at least part of the bits in the pdcch-ConfigSIB1 of the PBCH in the SSB to indicate existence or inexistence of the DBTW.

4) Part of bit fields in an SSB sub-carrier offset indication field in the SSB.

For example, the SSB sub-carrier spacing indication field is ssb-SubcarrierOffset of the PBCH in the SSB, that is, the ssb-SubcarrierOffset of the PBCH in the SSB is multiplexed to indicate the candidate SSB indexes. In this case, a least significant bit, namely an LSB hit, in the ssb-SubcarrierOffset of the PBCH in the SSB may be multiplexed to indicate existence or inexistence of the DBTW.

5) A reserved indication field in the SSB For example, the reserved indication field is a reserved indication field of the PBCH in the SSB, and is used for indicating the candidate SSB indexes.

6) A newly added indication field in the SSB. For example, the newly added indication field is an additional indication field added again in the SSB, and is used for indicating the candidate SSB indexes.

In this embodiment of this application, in a case of determining that the DBTW exists, the terminal may determine a value of a QCL parameter Q according to second information; and the second information may include at least one of the following:

(1) an SCS of the SSB.

For example, the value of Q may be directly inferred from the SCS of the SSB according to a preset rule. The preset rule may be predefined by the protocol or pre-configured by the network. For example, in predefinition of the protocol or pre-configuration of the network, when the SCS of the SSB is equal to 480, Q is equal to 16; or, when the SCS of the SSB is equal to 960, Q is equal to 16

(2) An indication field of system information in the SSB.

(3) A pattern of the SSB.

In some embodiments, for the patterns of the SSB, the different patterns of the SSB may correspond to the different values of Q. For example, if the pattern of the SSB is two SSBs being adjacent and having no gap, a value of Q is specified, such as 16; and if the pattern of the SSB is two SSBs having a gap, a value of Q is specified, such as 32.

(4) A pattern of the CORESET.

In some embodiments, for the patterns of the CORESET, the different patterns of the CORESET may correspond to the different values of Q.

In some embodiments, the above indication field of the system information may include at least one of the following 1) a sub-carrier spacing indication field in the SSB.

For example, the sub-carrier spacing indication field is subCarrierSpacingCommon of a PBCH in the SSB, that is, subCarrierSpacingCommon of the PBCH in the SSB is multiplexed to indicate the values of Q. In this case, it may set an SCS of an initial BWP to have a fixed scaling relationship with the SCS of the SSB, so as to determine an SCS of the initial BWP according to the SCS of the SSB, so that it is unnecessary to use subCarrierSpacingCommon of the PBCH in the SSB to indicate the SC'S of the initial BWP.

2) A PDSCH-DMRS position indication field in the SSB.

For example, the PDSCH-DMRS indication field is a PDSCH-DMRS position indication field of the PBCH in the SSB, that is, the PDSCH-DMRS position indication field of the PBCH in the SSB is multiplexed to indicate the values of Q In this case, it may set the PDSCH-DMRS position indication field to have a fixed scaling relationship with the SSB SCS, for example, one SSB SCS corresponds to one PDSCH-DMRS position, so as to determine the PDSCH-DMPS position according to the SSB SCS, or there is no relationship between the PDSCH-DMRS position indication field and the SSB SCS, but the PDSCH-DMRS position is fixed, so that it is unnecessary to use the PDSCH-DMRS position indication field of the PBCH in the SSB to indicate the PDSCH-DMRS position.

3) Part or all of bit fields in a PDCCH configuration system information block indication field in the SSB.

For example, the PDCCH configuration system information block indication field is a pdcch-ConfigSIB1 of the PBCH in the SSB, that is, the pdcch-ConfigSIB1 of the PBCH in the SSB is multiplexed to indicate the values of Q. In this case, the number of effective entries in a configuration table of a Coreset #0 and/or a configuration table of a Search space #0 may be set to decrease, so as to use at least part of the bits in the pdcch-ConfigSIB1 of the PBCH in the SSB to indicate existence or inexistence of the DBTW.

4) Part of bit fields in an SSB sub-carrier offset indication field in the SSB.

For example, the SSB sub-carrier spacing indication field is ssb-SubcarrierOffset of the PBCH in the SSB, that is, the ssb-SubcarrierOffset of the PBCH in the SSB is multiplexed to indicate the values of Q In this case, a least significant bit, namely an LSB bit, in the ssb-SubcarrierOffset of the PBCH in the SSB may be multiplexed to indicate existence or inexistence of the DBTW.

5) A reserved indication field in the SSB. For example, the reserved indication field is a reserved indication field of the PBCH in the SSB, and is used for indicating the values of Q.

6) A newly added indication field in the SSB. For example, the newly added indication field is an additional indication field added again in the SSB, and is used for indicating the values of Q.

In this embodiment of this application, after determining the values of Q, the terminal may determine a QCL relationship among candidate SSBs. The QCL relationship may be: the QCL relationship of the candidate SSBs with the same first value being the same, wherein the first value is obtained by performing modulus calculation on X and Q*Y, and X is indexes of the candidate SSBs, and the QCL relationship of every Y successive candidate SSBs starting from an initial index (such as an index 0) being the same, wherein X is an integer greater than or equal to 0, and Y is an integer greater than or equal to 1. For example, if Y=2, and Q=4, a QCL index corresponding to the candidate SSB may be 0011223300112233, and two successive same numbers represent corresponding SSBs being the QCL.

In this embodiment of this application, the terminal may further acquire third information, and determine an actually sent SSB according the third information, and the third information may include at least one of the following: a value of Q, a DBTW configuration, and an SSB position indication field. The SSB position indication field may include a second indication field and a third indication field, the second indication field is used for indicating whether candidate SSB groups are actually sent, and the third indication field is used for indicating SSBs actually sent in each candidate SSB group. It may be understood that the second indication field is similar to a groupPresence indication field in an SIB1, and the third indication field is similar to an inOneGroup indication field in the SIB1.

In some embodiments, the second indication field may have N1 bits, the third indication field may have N2 bits, the number of the candidate SSBs is L, the number of the candidate SSB groups is N3, and each candidate SSB group contains or at most contains M candidate SSBs; and N1 and N2 are integers greater than or equal to 0, and N3 and M are integers greater than or equal to 1.

In some embodiments, an actually sent candidate SSB index set is: {(i−1)*M, (i−1)*M+1, . . . , i*M−1}, {(i−1)*M+Q*Y, (i−1)*M+1+Q*Y, . . . , i*M−1+Q*Y}, . . . , {(i−1)*M+b*Q*Y, (i−1)*M+1+b*Q*Y, . . . , i*M−1+b*Q*Y}. An $i^{th}$ bit in the N1 bits is a first numerical value, and the first numerical value is used for indicating that the candidate SSB group indicated by the $i^{th}$ bit is actually sent. For example, the first numerical value is 1, and if a value of the $i^{th}$ bit is 0, it is indicated that the corresponding candidate SSB group is not actually sent. The QCL relationship of every Y successive candidate SSBs starting from the initial index is the same. b is a maximum integer that meets a condition of i*M−1+b*Q*Y<=L−1. L is the number of the candidate SSBs; and i is an integer greater than or equal to 1.

In some embodiments, the actually sent SSBs are located in a candidate SSB set indicated by the DBTW configuration. The candidate SSB set indicated by the DBTW configuration may include all candidate SSBs from a candidate SSB index a to a candidate SSB index a+D; and a is an integer greater than or equal to 0, and D is an integer greater than or equal to 1.

In an implementation, the above N1, N2, N3 and M are all values predefined by the protocol, such as, N1=8, N2=8, and M=8.

In some embodiments, effective bits in the above N1 bits may be determined according to the value of Q and/or the DBTW configuration, such as Q/N1, Q/N2 or Q/M, and other ineffective bits are set as specific values or be ignored. Or, the effective bits in the above N1 bits are a plurality of successive bits at preset positions, such as 4 successive bits before the preset positions, or 4 successive bits after the preset positions.

In some embodiments, at least one of above N1, N2, N3 and M may be determined according to the values of Q and/or the DBTWV configuration.

For example, N1 and N2 are predefined values, M is calculated according to the value of Q and N1, and M values at preset positions in the N2 bits are effective values. M may be calculated by adopting any one of following formulas:

$$M=Q/N_1 \qquad \text{formula 1;}$$

$$M=\lfloor Q/N_1 \rfloor \qquad \text{formula 2; and}$$

$$M=\lceil Q/N_1 \rceil \qquad \text{formula 3;}$$

where, / represents a division sign, $\lceil\ \rceil$ represents an upward rounding symbol, and $\lfloor\ \rfloor$ represents a downward rounding symbol.

In some embodiments, above N1, N2 and M may all be obtained according to the value of Q. Above N1 may be determined according to the value of Q and at least one of the following:

a predefined corresponding relationship between a value of Q and N1; for example, it may be a predefined table of the value of Q and N1, and different values of Q correspond to different values of N1;

a preset function relationship between a value of Q and N1; for example, M is equal to upward rounding of $$\left( \frac{N-\sqrt{N^2-4Q}}{2} \right), N2 = M,$$

N1 is equal to upward rounding of Q/M, or, N1 is equal to (N–N2), N is the predefined value, and N is equal to N1+N2;

in a case that the value of Q is less than or equal to a first threshold, N1 is equal to a second numerical value; or, in a case that the value of Q is greater than the first threshold, N1 is determined through the predefined corresponding relationship between the value of Q and N1, or the preset function relationship between the value of Q and N1; for example, the first threshold may be a value predefined by the protocol, such as 16, and the second numerical value may be a value predefined by the protocol, such as being equal to the value of Q. In a case that the value of Q is greater than the first threshold, the effective bits in the N1 bits may be predefined by the protocol.

In some embodiments, above N2 may be determined according to the value of Q and at least one of the following:

a predefined corresponding relationship between a value of Q and N2; and for example, it may be a predefined table of the value of Q and N2, and different values of Q correspond to different values of N2;

a preset function relationship between a value of Q and N2; for example, M is equal to upward rounding of $$\left(\frac{N - \sqrt{N^2 - 4Q}}{2}\right), N2 = M,$$

N1 is equal to upward rounding of Q/M, or, N1 is equal to (N–N2), N is the predefined value, and N is equal to N1+N2;

in a case that the value of Q is less than or equal to a second threshold, N2 is equal to a third numerical value; or, in a case that the value of Q is greater than the second threshold, N2 is determined through the predefined corresponding relationship between the value of Q and N2, or the preset function relationship between the value of Q and N2; for example, the second threshold may be a value predefined by the protocol, such as 16; and the third numerical value may be a value predefined by the protocol, such as being equal to 0.

In some embodiments, above M may be determined according to the value of Q and at least one of the following:

a predefined corresponding relationship between a value of Q and M; for example, it may be a predefined table of the value of Q and M, and different values of Q correspond to different values of M;

a preset function relationship between a value of Q and M; for example, M is equal to upward rounding of $$\left(\frac{N - \sqrt{N^2 - 4Q}}{2}\right), N2 = M,$$

N1 is equal to upward rounding of Q/M, or, N1 is equal to (N–N2), N is the predefined value, and N is equal to N1+N2;

in a case that the value of Q is less than or equal to a third threshold, M is equal to a fourth numerical value; or, in a case that the value of Q is greater than the third threshold, M is determined through the predefined corresponding relationship between the value of Q and M, or the preset function relationship between the value of Q and M; for example, the third threshold may be a value predefined by the protocol, such as 16; and the fourth numerical value may be a value predefined by the protocol, such as being equal to 1.

Some embodiments of this application are described in detail below.

Figures 3, 4:
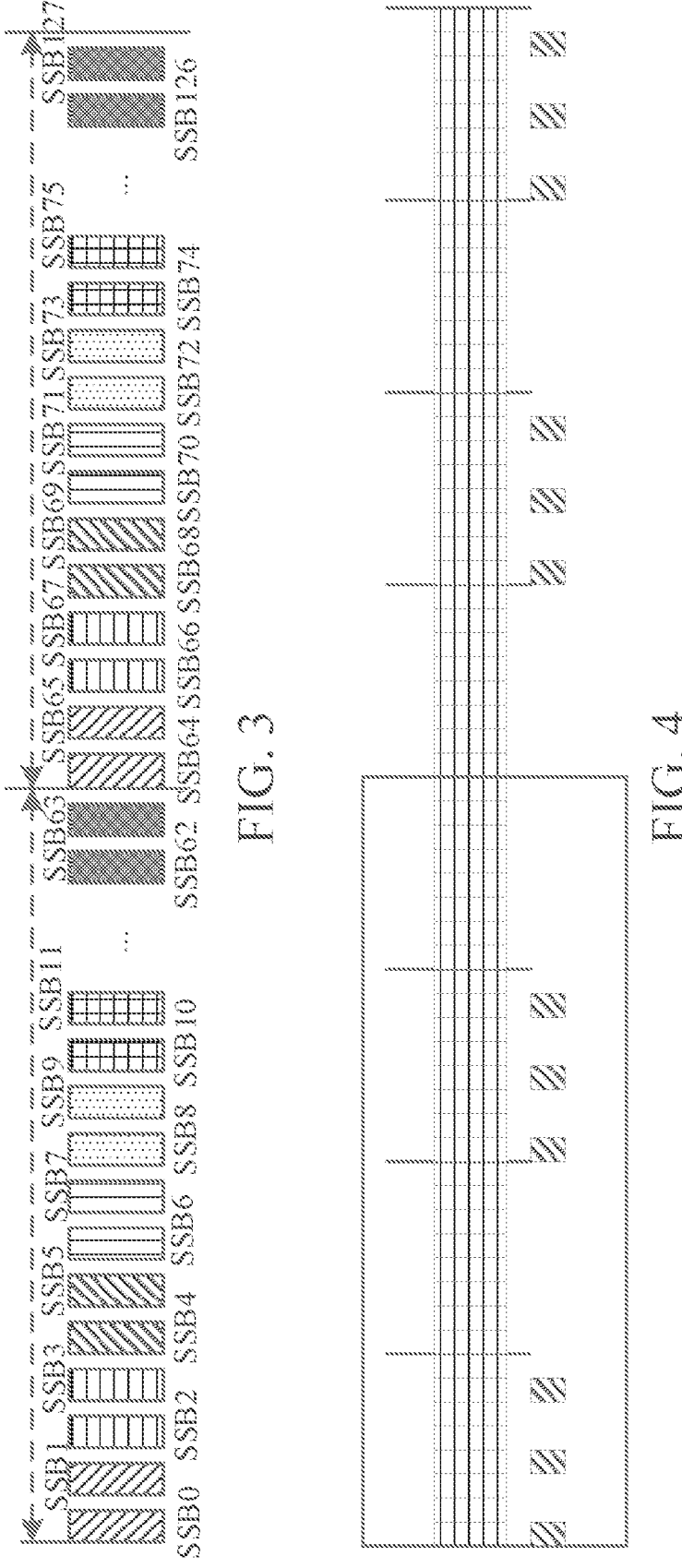
FIG. 3 is a schematic diagram of candidate SSBs according to an embodiment of this application.
FIG. 4 is a schematic diagram of an SSB configuration according to an embodiment of this application.

In some embodiments of this application, considering insufficient beam switching time (beam switching time), the number of candidate SSBs may be increased to 128 firstly, and then it is assumed that two successive candidate SSBs are QCL, that is, an SSB0 and an SSB1, an SSB2 and an SSB3, . . . and the like are QCL, as shown in FIG. 3.

Assuming that at this time, M=4:8, Q=32, Y==2, N={01000000}, each bit in N1 represents 8 bits, that is, it indicates whether 8 candidate SSBs contained in each candidate SSB group are actually sent, and then according to N1 configuration, and an actually sent candidate SSB index set being: {(i–1)*M, (i–1)*M+1, . . . , i*M–1}, {(i–1)*M+Q*Y, (i–1)*M+1+Q*Y, . . . , i*M–1+Q*Y}, . . . , {(i–1)*M+ b*Q*Y, (i–1)*M+1+b*Q*Y, . . . , i*M–1+b*Q*Y}, it may be known that, since a numerical value "1" of a second bit in the N1 bits indicates that the corresponding candidate SSB group is actually sent, therefore, i is equal to 2, that is, the actually sent candidate SSB index set is: {8, 9, 10 . . . and 15}, and {72, 73, 74 . . . and 79}.

In some embodiments of this application, assuming that the number of the candidate SSBs is 64, the SSB position indication field, such as SSb-positionsInBurst, is 16 bits, wherein the groupPresence indication field is (10100101), the inOneGroup indication field is (10010010), Q is equal to 32, then FIG. 4 may be obtained according to this configuration, blocks filled with horizontal lines in FIG. 4 represent the candidate SSBs (64), and blocks filled with diagonal lines in FIG. 4 represent the actually sent SSBs, which are indicated by SSb-positionsInBurst.

Since Q=32, there is a QCL relationship every 32 SSBs. At this time, the QCL relationship (as shown in FIG. 4) cannot be achieved if according to the configuration of SSB-positionInBurst, so the following solution may be adopted.

1) effective bits in the N1 bits are determined according to the value of Q and/or the DBTW configuration, such as Q/N1, Q/N2 or Q/M, and other ineffective bits are set as specific values or be ignored; and the effective bits generally are a plurality of preceding successive bits. For example, as shown in FIG. 4, first 4 bits in the groupPresence indication field, namely (10100101) may be determined as the effective bits.

2) The actually sent SSBs are determined according to the value of Q and a redefined value of M. The redefined value of M may be determined according to the value of Q, such as: M=Q/N1 As shown in the example in FIG. 4, Q==32, and N1=8, therefore, N=32/8=4 that is, at this time, it may be considered that each bit in N1 represents 4 SSBs. At this time, a definition of the inOneGroup indication field also needs to be redefined, that is, based on the value of Q, it is defaulted that how many successive (first) bits in the inOneGroup indication field are effective. For example, when Q=32, Q/8=4, that is, 4 SSBs are one group, and then successive (first) 4 bits in the inOneGroup indication field are effective.

In some embodiments of this application, the terminal may determine values of N1, N2 and M according to the value of Q and a certain mule, so as to determine the actually sent SSBs. For example, Q≤16, since N1+N2 totally contains 16 bits, the definitions of N1 and N2 may be modified, and at this time, the bits in N1 and N2 directly indicate positions of the actually sent SSBs. Or, for example, when Q>16, the effective bits in the N1 bits may be predefined by the protocol, or the actually sent SSBs are determined according to the value of Q and the redefined value of M.

Figures 5, 6:
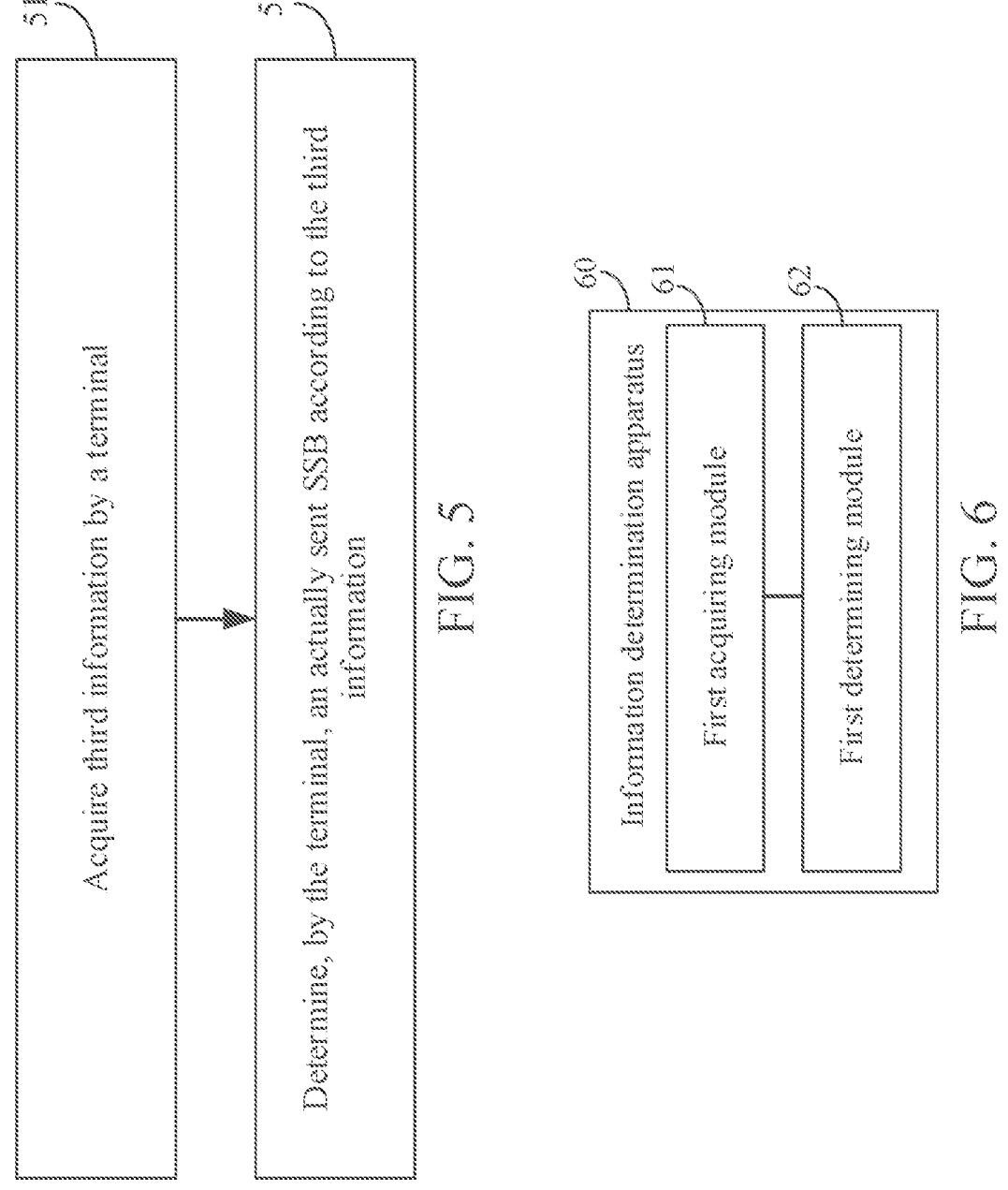
FIG. 5 is a flowchart of another information determination method according to an embodiment of this application.
FIG. 6 is a schematic structural diagram of an information determination apparatus according to an embodiment of this application.

Please refer to FIG. 5, FIG. 5 is a flowchart of an information determination method provided by an embodiment of this application. The method is executed by a terminal. As shown in FIG. 5, the method includes the following steps:

step 51, the terminal acquires third information

In this embodiment, the third information may include at least one of the following: a value of Q, a DBTW configuration, and an SSB position indication field. The SSB position indication field may include a second indication field and a third indication field, the second indication field is used for indicating whether candidate SSB groups are actually sent, and the third indication field is used for indicating SSBs actually sent in each candidate SSB group. It may be understood that the second indication field is similar to a groupPresence indication field in an SIB1, and the third indication field is similar to an inOneGroup indication field in the SIB1.

Step 52, the terminal determines actually sent SSBs according to the third information.

In some embodiments, the actually sent SSBs are located in a candidate SSB set indicated by the DBTW configuration. The candidate SSB set indicated by the DBTW configuration may include all candidate SSBs from a candidate SSB index a to a candidate SSB index a+D; and a is an integer greater than or equal to 0, and D is an integer greater than or equal to 1.

According to the information determination method in this embodiment of this application, the actually sent SSBs may be determined according to the acquired value of Q, the DBTW configuration and/or the SSB position indication field.

In this embodiment of this application, the second indication field may have N1 bits, the third indication field may have N2 bits, the number of the candidate SSBs is L, the number of the candidate SSB groups is N3, and each candidate SSB group contains or at most contains M candidate SSBs; and N1 and N2 are integers greater than or equal to 0, and N3 and M are integers greater than or equal to 1.

In an implementation, the above N1, N2, N3 and M are all values predefined by the protocol, such as, N1=8, N2=8, and M=8.

In some embodiments, an actually sent candidate SSB index set is {(i−1)*M, (i−1)*M+1, . . . , i*M−1}, {(i−1)*M+Q*Y, (i−1)*M+1+Q*Y, . . . , i*M−1+Q*Y}, . . . , {(i−1)*M+b*Q*Y, (i−1)*M+1+b*Q*Y, . . . , i*M−1+b*Q*Y}. An $i^{th}$ bit in the N1 bits is a first numerical value, and the first numerical value is used for indicating that the candidate SSB group indicated by the $i^{th}$ bit is actually sent. For example, the first numerical value is 1, and if a value of the $i^{th}$ bit is 0, it is indicated that the corresponding candidate SSB group is not actually sent. The QCL relationship of every Y successive candidate SSBs starting from the initial index is the same. b is a maximum integer that meets a condition of i*M−1+b*Q*Y<=L−1. L is the number of the candidate SSBs; and i is an integer greater than or equal to 1.

In some embodiments, effective bits in the above N1 bits may be determined according to the value of Q and/or the DBTW configuration, such as Q/N1, Q/N2 or Q/M, and other ineffective bits are set as specific values or be ignored. Or, the effective bits in the above N1 bits are a plurality of successive bits at preset positions, such as 4 successive bits before the preset positions, or 4 successive bits after the preset positions.

In some embodiments, at least one of above N1, N2, N3 and M may be determined according to the values of Q and/or the DBTWV configuration.

For example, N1 and N2 are predefined values, M is calculated according to the value of Q and N1, and M values at preset positions in the N2 bits are effective values. M may be calculated by adopting any one of following formulas:

$$M=Q/N_1 \qquad \text{formula 1;}$$

$$M=\lfloor Q/N_1 \rfloor \qquad \text{formula 2; and}$$

$$M=\lceil Q/N_1 \rceil \qquad \text{formula 3;}$$

where, / represents a division sign, $\lceil \ \rceil$ represents an upward rounding symbol, and $\lfloor \ \rfloor$ represents a downward rounding symbol.

In some embodiments, above N1, N2 and M may all be obtained according to the value of Q. Above N1 may be determined according to the value of Q and at least one of the following:

a predefined corresponding relationship between a value of Q and N1; for example, it may be a table of the predefined value of Q and N1, and different values of Q correspond to different values of N1;

a preset function relationship between a value of Q and N1; for example, M is equal to upward rounding of $$\left( \frac{N - \sqrt{N^2 - 4Q}}{2} \right), N2 = M,$$

N1 is equal to upward rounding of Q/M, or, N1 is equal to (N−N2), N is the predefined value, and N is equal to N1+N2;

in a case that the value of Q is less than or equal to a first threshold, N1 is equal to a second numerical value; or, in a case that the value of Q is greater than the first threshold, N1 is determined through the predefined corresponding relationship between the value of Q and N1, or the preset function relationship between the value of Q and N1; for example, the first threshold may be a value predefined by the protocol, such as 16, and the second numerical value may be a value predefined by the protocol, such as being equal to the value of Q. In a case that the value of Q is greater than the first threshold, the effective bits in the N1 bits may be predefined by the protocol.

In some embodiments, above N2 may be determined according to the value of Q and at least one of the following:

a predefined corresponding relationship between a value of Q and N2; and for example, it may be a predefined table of the value of Q and N2, and different values of Q correspond to different values of N2;

a preset function relationship between a value of Q and N2; for example, M is equal to upward rounding of $$\left( \frac{N - \sqrt{N^2 - 4Q}}{2} \right), N2 = M,$$

N1 is equal to upward rounding of Q/M, or, N1 is equal to (N−N2). N is the predefined value, and N is equal to N1+N2;

in a case that the value of Q is less than or equal to a
second threshold, N2 is equal to a third numerical
value; or, in a case that the value of Q is greater than
the second threshold, N2 is determined through the
predefined corresponding relationship between the
value of Q and N2, or the preset function relationship
between the value of Q and N2; for example, the
second threshold may be a value predefined by the
protocol, such as 16; and the third numerical value may
be a value predefined by the protocol, such as being
equal to 0.

In some embodiments, above M may be determined
according to the value of Q and at least one of the following:
a predefined corresponding relationship between a value
of Q and M; for example, it may be a table of the
predefined value of Q and M, and different values of Q
correspond to different values of M;
a preset function relationship between a value of Q and M;
for example, M is equal to upward rounding of $$\left(\frac{N - \sqrt{N^2 - 4Q}}{2}\right), N2 = M,$$

N1 is equal to upward rounding of Q/M, or, N1 is equal to
(N−N2), N is the predefined value, and N is equal to N1+N2;
in a case that the value of Q is less than or equal to a third
threshold, M is equal to a fourth numerical value; or, in
a case that the value of Q is greater than the third
threshold, M is determined through the predefined
corresponding relationship between the value of Q and
M, or the preset function relationship between the value
of Q and M; for example, the third threshold may be a
value predefined by the protocol, such as 16; and the
fourth numerical value may be a value predefined by
the protocol, such as being equal to 1.

It needs to be noted that, In the information determination
method provided by this embodiment of this application, an
executive body may be an information determination appa-
ratus, or a control module which is in the information
determination apparatus and is used for executing the infor-
mation determination method. In this embodiment of this
application, taking the information determination apparatus
executing the information determination method as an
example, the information determination apparatus provided
by this embodiment of this application is described.

Please refer to FIG. 6, FIG. 6 is a schematic structural
diagram of an information determination apparatus provided
by an embodiment of this application. The apparatus is
applied to a terminal. As shown in FIG. 6, the information
determination apparatus 60 includes:
a first acquiring module 61, configured to acquire an SSB;
and
a first determining module 62, configured to determine
whether a DBTW exists according to first information
and/or RRC signaling,
wherein, the first information includes at least one of the
following:
frequency band information of the SSB;
system information of the SSB,
sequence information of the SSB; and
an SCS of the SSB In this embodiment of this application, after acquiring the
SSB, the terminal may determine whether the DBTW exists
according to the first information and/or the RRC signaling,
and the first information includes at least one of the following: the frequency band information of the SSB, the system
information in the SSB, the sequence information of the
SSB, and the SCS of the SSB, so as to determine that the
DBTW exists or the DBTW does not exist.

In some embodiments, the frequency band information of
the SSB includes at least one of the following:
a frequency band range where the SSB is located;
a raster where the SSB is located; and
a frequency position where the SSB is located.

In some embodiments, the system information includes a
first indication field, the first indication field is used for
indicating existence or inexistence of the DBTW, and the
first indication field includes at least one of the following:
a sub-carrier spacing indication field in the SSB;
a PDSCH-DMRS position indication field in the SSB;
part or all of bit fields in a PDCCH configuration system
information block indication field in the SSB;
part of bit fields in an SSB sub-carrier offset indication
field in the SSB;
a reserved indication field in the SSB; and
a newly added indication field in the SSB.

In some embodiments, the sequence information of the
SSB includes at least one of the following:
a time field position relationship between the PSS and the
SSS in the SSB;
a frequency field position relationship between the PSS
and the SSS in the SSB;
a phase difference or cyclic shift between the PSS and the
SSS in the SSB;
a phase difference or cyclic shift of the PSS in the SSB,
a phase difference or cyclic shift of the SSS in the SSB;
a sequence of the PSS and/or the SSS in the SSB; and
a phase difference or cyclic shift of the DMRS of a PBCH
in the SSB.

In some embodiments, the first determining module 62 is
further configured to:
determine that the DBTW exists in a case that the SCS of
the SSB is a first SCS, or, determine that the DBTW
does not exist in a case that the SCS of the SSB is not
the first SCS.

In some embodiments, the first determining module 62 is
further configured to: determine, in a case of determining
that the DBTW exists, a size of the DBTW according to the
system information and/or the RRC signaling.

In some embodiments, the size of the DBTW is config-
ured with slot as a basic unit; and/or, the size of the DBTW
is configured in a scaling form according to the SCS and a
size of a default DBTW In some embodiments, in a case of determining that the
DBTW exists, the maximum number of candidate SSB
indexes is a*L; wherein, L is the maximum number of the
candidate SSB indexes in a case that the DBTW does not
exist; and a is an expansion factor.

In some embodiments, a is any one of the following:
a predefined value; and
a value determined according to the SCS of the SSB
and/or a pattern of the SSB In some embodiments, the candidate SSB indexes are
determined through a candidate SSB index indication field
and at least one of the following:
a sub-carrier spacing indication field in the SSB;
a PDSCH-DMRS position indication field in the SSB;
part or all of bit fields in a PDCCH configuration system
information block indication field in the SSB;
part of bit fields in an SSB sub-carrier offset indication
field in the SSB;
a reserved indication field in the SSB; and a newly added indication field in the SSB.

In some embodiments, the first determining module 62 is further configured to: determine, in a case of determining that the DBTW exists, a value of a QCL parameter Q according to second information;

wherein, the second information includes at least one of the following:

an SCS of the SSB;

an indication field of system information in the SSB;

a pattern of the SSB; and a pattern of the CORESET.

In some embodiments, the different patterns of the SSB correspond to the different values of Q;

and/or, the different patterns of the CORESET correspond to the different values of Q.

In some embodiments, the indication field of the system information includes at least one of the following:

a sub-carrier spacing indication field in the SSB;

a PDSCH-DMRS position indication field in the SSB;

part or all of bit fields in a PDCCH configuration system information block indication field in the SSB;

part of bit fields in an SSB sub-carrier offset indication field in the SSB;

a reserved indication field in the SSB; and a newly added indication field in the SSB.

In some embodiments, the first determining module 62 is further configured to-determine a QCL relationship among candidate SSBs according to the value of Q:

wherein, the QCL relationship is: the QCL relationship of the candidate SSBs with the same first value being the same, wherein the first value is obtained by performing modulus calculation on X and Q*Y, and X is indexes of the candidate SSBs; and a QCL relationship of every Y successive candidate SSBs starting from an initial index is the same; X is an integer greater than or equal to 0, and Y is an integer greater than or equal to 1.

The information determination apparatus 60 provided by this embodiment of this application can implement the processes implemented by the method embodiment in FIG. 2 and achieve the same technical effects, which will not be repeated here to avoid repetition.

Figures 7, 8:
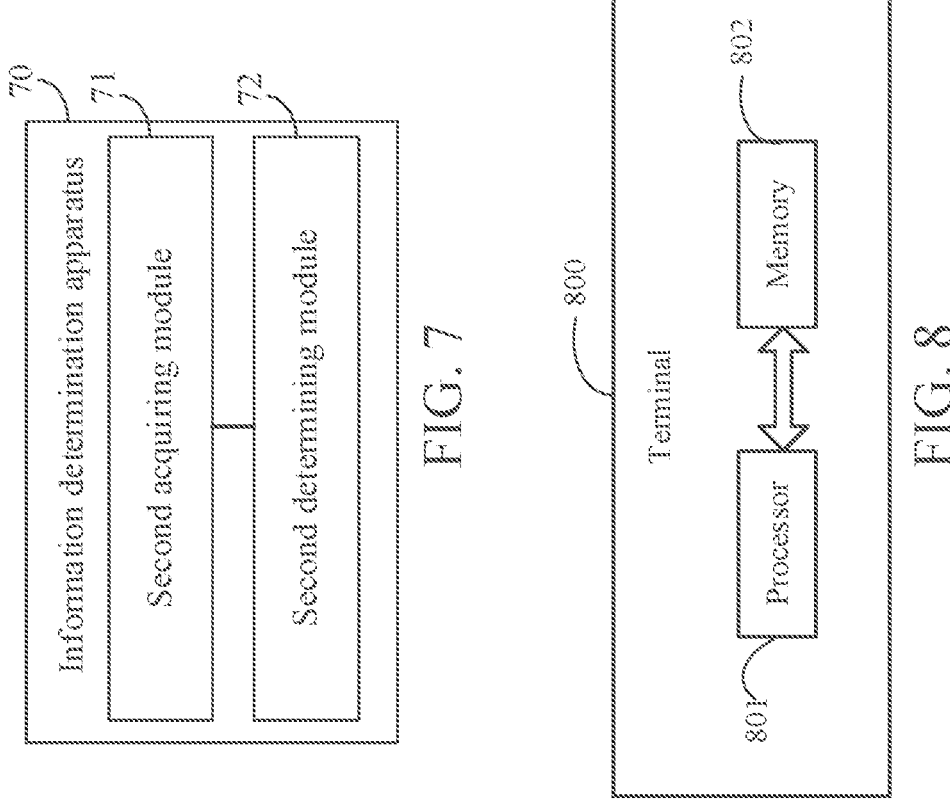
FIG. 7 is a schematic structural diagram of another information determination apparatus according to an embodiment of this application.
FIG. 8 is a schematic structural diagram of a terminal according to an embodiment of this application.

Please refer to FIG. 7, FIG. 7 is a schematic structural diagram of an information determination apparatus provided by an embodiment of this application. The apparatus is applied to a terminal. As shown in FIG. 7, the information determination apparatus 70 includes:

a second acquiring module 71, configured to acquire third information; and a second determining module 72, configured to determine an actually sent SSB according to the third information.

The third information includes at least one of the following: a value of a QCL parameter Q, a DBTW configuration, and an SSB position indication field; the SSB position indication field includes a second indication field and a third indication field; the second indication field is used for indicating whether candidate SSB groups are actually sent; and the third indication field is used for indicating actually sent SSBs in each candidate SSB group.

In some embodiments, the second indication field has N1 bits, the third indication field has N2 bits, the number of the candidate SSB groups is N3, and each candidate SSB group contains or at most contains M candidate SSBs; and N1 and N2 are integers greater than or equal to 0, and N3 and M are integers greater than or equal to 1.

In some embodiments, an actually sent candidate SSB index set is: $\{(i-1)*M, (i-1)*M+1, \ldots, i*M-1\}$, $\{(i-1)$ $*M+Q*Y, (i-1)*M+1+Q*Y, \ldots, i*M-1+Q*Y\}, \ldots, \{(i-1)*M+b*Q*Y, (i-1)*M+1+b*Q*Y, \ldots, i*M-1+b*Q*Y\}$;

wherein, an $i^{th}$ bit in the N1 bits is a first numerical value, and the first numerical value is used for indicating that the candidate SSB group indicated by the $i^{th}$ bit is actually sent; a QCL relationship of every Y successive candidate SSBs starting from an initial index is the same; b is a maximum integer that meets a condition of $i*M-1+b*Q*Y<=L-1$; L is the number of the candidate SSBs; and i is an integer greater than or equal to 1.

In some embodiments, a candidate SSB set indicated by the DBTW configuration includes all candidate SSBs from a candidate SSB index a to a candidate SSB index a+D; and a is an integer greater than or equal to 0, and D is an integer greater than or equal to 1.

In some embodiments, effective bits in the N1 bits are determined according to the value of Q and/or the DBTW configuration.

In some embodiments, effective bits in the N1 bits are a plurality of successive bits at preset positions.

In some embodiments, at least one of N1, N2, N3 and M is determined according to the value of Q and/or the DBTW configuration.

In some embodiments, N1 and N2 are predefined values, M is calculated according to the value of Q and N1, and M values at preset positions in the N2 bits are effective values.

In some embodiments, M is calculated by adopting any one of following formulas:

$$M=Q/N_1 \qquad \text{formula 1;}$$

$$M=\lfloor Q/N_1 \rfloor \qquad \text{formula 2; and}$$

$$M=\lceil Q/N_1 \rceil \qquad \text{formula 3;}$$

where, / represents a division sign, $\lceil\ \rceil$ represents an upward rounding symbol, and $\lfloor\ \rfloor$ represents a downward rounding symbol.

In some embodiments, N1 is determined according to the value of Q and at least one of the following:

a predefined corresponding relationship between a value of Q and N1;

a preset function relationship between a value of Q and N1;

in a case that the value of Q is less than or equal to a first threshold, N1 is equal to a second numerical value; or, in a case that the value of Q is greater than the first threshold, N1 is determined through the predefined corresponding relationship between the value of Q and N1, or the preset function relationship between the value of Q and N1;

and/or, N2 is determined according to the value of Q and at least one of the following:

a predefined corresponding relationship between a value of Q and N2; and a preset function relationship between a value of Q and N2;

in a case that the value of Q is less than or equal to a second threshold, N2 is equal to a third numerical value; or, in a case that the value of Q is greater than the second threshold, N2 is determined through the predefined corresponding relationship between the value of Q and N2, or the preset function relationship between the value of Q and N2;

and/or, M is determined according to the value of Q and at least one of the following:

a predefined corresponding relationship between a value of Q and M;

a preset function relationship between a value of Q and M;

in a case that the value of Q is less than or equal to a third threshold, M is equal to a fourth numerical value; or, in a case that the value of Q is greater than the third threshold, M is determined through the predefined corresponding relationship between the value of Q and M, or the preset function relationship between the value of Q and M.

The information determination apparatus 70 in this embodiment of this application may be an apparatus, or an apparatus or electronic device having an operating system, and may also be a component, an integrated circuit or a chip in the terminal. The apparatus or electronic device may be a mobile terminal, or may be a non-mobile terminal. Exemplarily, the mobile terminal may include, but is not limited to the above listed types of the terminal 11, and the non-mobile terminal may be a server, a Network Attached Storage (NAS), a Personal Computer (PC), a Television (TV), a teller machine, or an automated machine, which are not specifically limited in this embodiment of this application.

The information determination apparatus 70 provided by this embodiment of this application can implement the processes implemented by the method embodiment of FIG. 5 and achieve the same technical effects, which will not be repeated here to avoid repetition.

For example, as shown in FIG. 8, an embodiment of this application further provides a terminal 800, including a processor 801, a memory 802, and a program or instruction stored on the memory 802 and capable of running on the processor 801, and the program or instruction, when executed by the processor 801, implements the processes of the embodiments of the above information determination method, which can achieve the same technical effects and will not be repeated here to avoid repetition.

An embodiment of this application further provides a terminal, including a processor and a communication interface, and the processor is configured to acquire an SSB, and determine whether a DBTW exists according to first information and/or RRC signaling; the first information includes at least one of the following: frequency band information of the SSB, system information in the SSB, sequence information of the SSB, and an SCS of the SSB; or, the processor is configured to acquire third information, and determine an actually sent SSB according to the third information; the third information includes at least one of the following: a value of a QCL parameter Q, a DBTW configuration, and an SSB position indication field; the SSB position indication field includes a second indication field and a third indication field; the second indication field is used for indicating whether candidate SSB groups are actually sent; and the third indication field is used for indicating actually sent SSBs in each candidate SSB group. The terminal embodiment corresponds to the above method embodiment on the terminal side, and all implementation processes and implementations of the above method embodiment may all be applied to the terminal embodiment, and can achieve the same technical effects.

Figure 9:
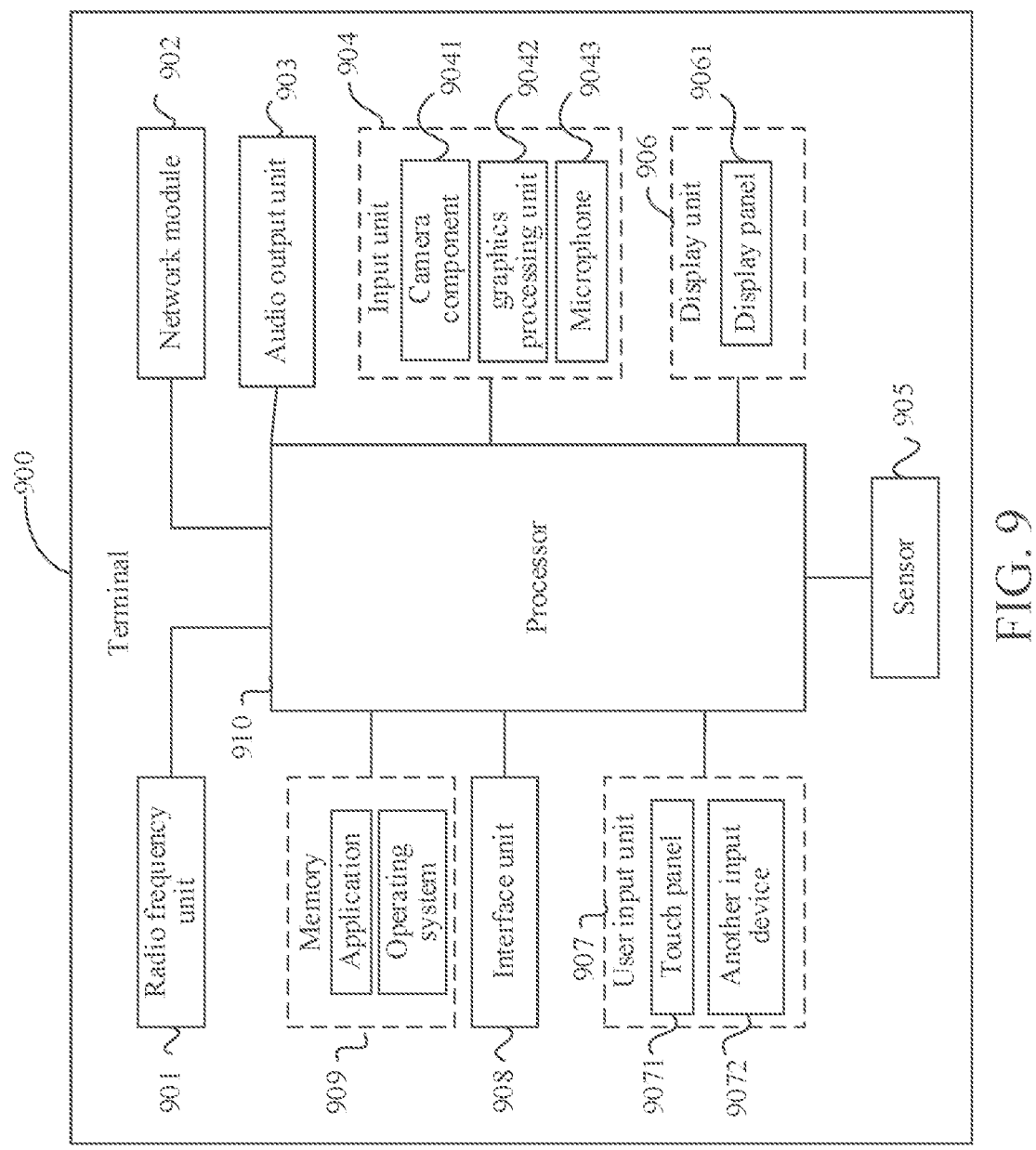
FIG. 9 is a schematic structural diagram of another terminal according to an embodiment of this application.

For example, FIG. 9 is a schematic structural diagram of hardware of a terminal for implementing an embodiment of this application.

The terminal 900 includes, but is not limited to: at least part of components in a radio frequency unit 901, a network module 902, an audio output unit 903, an input unit 904, a sensor 905, a display unit 906, a user input unit 907, an interface unit 908, a memory 909, a processor 910 and the like.

A person skilled in the art may understand that the terminal 900 may further include a power supply (such as a battery) for supplying power to the components. The power supply may be logically connected to the processor 910 by using a power management system, thereby implementing functions, such as charging, discharging, and power consumption management, by using the power management system. The structure of the terminal shown in FIG. 9 constitutes no limitation to the terminal, and the terminal may include more or fewer components than those shown in the figure, or some components may be combined, or a different component deployment may be used, which will not be repeated here.

It is to be understood that in this embodiment of this application, the input unit 904 may include a camera component 9041, a Graphics Processing Unit (GPU) 9042 and a microphone 9043. The graphics processing unit 9042 performs processing on image data of a static picture or a video that is obtained by an image acquisition apparatus (such as, a camera) in a video acquisition mode or an image acquisition mode. The display unit 906 may include a display panel 9061. The display panel 9061 may be configured in the form of a liquid crystal display, an organic light-emitting diode, or the like. The user input unit 907 includes a touch panel 9071 and another input device 9072. The touch panel 9071 is also called a touch screen. The touch panel 9071 may include two parts: a touch detection apparatus and a touch controller. The another input device 9072 may include, but is not limited to, a physical keyboard, a functional key (such as a volume control key or a switch key), a track ball, a mouse, and a joystick, which will not be repeated here.

In this embodiment of this application, after downlink data from a network side device is received, the radio frequency unit 901 sends the downlink data to the processor 910 for processing; and in addition, uplink data is sent to the network side device. Generally, the radio frequency unit 901 includes, but is not limited to, an antenna, at least one amplifier, a transceiver, a coupler, a low noise amplifier, a duplexer, and the like.

The memory 909 may be configured to store a software program or instruction, and various pieces of data. The memory 909 may mainly include a program or instruction storage area and a data storage area. The program or instruction storage area may store an operating system, an application program or instruction required by at least one function (for example, a sound playback function and an image display function), and the like. In addition, the memory 909 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory. For example, it is at least one magnetic disk storage device, a flash memory or another volatile solid-state storage device.

The processor 910 may include one or more processing units. In some embodiments, the processor 910 may integrate an application processor and a modem processor. The application processor mainly processes an operating system, a user interface, an application program or instruction, and the like. The modem processor mainly processes wireless communication, such as a baseband processor. It can be understood that, the modem processor may not be integrated into the processor 910.

The processor 910 is configured to acquire an SSB, and determine whether a DBTW exists according to first information and/or RRC signaling. The first information includes at least one of the following: frequency band information of the SSB, system information in the SSB, sequence information of the SSB, and an SCS of the SSB.

In this embodiment of this application, after acquiring the SSB, the terminal 900 may determine whether the DBTW exists according to the first information and/or the RRC signaling, so as to determine that the DBTW exists or the DBTW does not exist.

In some embodiments, the processor 910 is configured to acquire third information, and determine actually sent SSBs according to the third information; the third information includes at least one of the following a value of a QCL parameter Q, a DBTW configuration, and an SSB position indication field; the SSB position indication field includes a second indication field and a third indication field, the second indication field is used for indicating whether candidate SSB groups are actually sent, and the third indication field is used for indicating actually sent SSBs in each candidate SSB group.

In this embodiment of this application, after acquiring the third information, the terminal 900 may determine the actually sent SSBs according to the third information.

It may be understood that the terminal 900 provided by this embodiment of this application can implement the processes implemented by the method embodiment in FIG. 2 or FIG. 5, and achieve the same technical effects, which will not be repeated here to avoid repetition.

An embodiment of this application further provides a readable storage medium, storing a program or instruction, the program or instruction, when executed by a processor, implements the processes of the embodiments of the above information determination method, which can achieve the same technical effects and will not be repeated here to avoid repetition.

The processor is the processor in the terminal in the above embodiment. The readable storage medium includes a computer-readable storage medium, such as a computer ROM, a Random Access Memory (RAM), a magnetic disk, or an optical disc.

An embodiment of this application further provides a chip, including a processor and a communication interface, the communication interface is coupled to the processor, and the processor is configured to run a program or instruction to implement the processes of the embodiments of the above information determination method, which can achieve the same technical effects and will not be repeated here to avoid repetition.

It is to be understood that the chip mentioned in this embodiment of this application may also be called a system-level chip, a system chip, a chip system, a system-on-a-chip or the like.

An embodiment of this application provides a terminal, configured to execute the processes of all embodiments of the above method, and the same technical effects can be achieved, which will not be repeated here to avoid repetition.

It needs to be noted that, the term "include", "contain", or any other variation thereof herein is intended to cover a non-exclusive inclusion, so that a process, a method, an article or an apparatus including a series of elements not only includes those elements, but also includes other elements not listed clearly, or further includes elements inherent to the process, the method, the article or the apparatus. Without more limitations, elements defined by the sentence "including one . . . " do not exclude that there are still other same elements in the process, method, article, or apparatus including the elements. Besides, the scope of the method and the apparatus in implementations of this application is not limited to executing functions according to a shown or discussed sequence, it may also include that functions are executed in a basically simultaneously mode or in an opposite sequence according to the involved functions, for example, the described method may be executed in an order different from the described one, and various steps may also be added, omitted, or combined. In addition, features described in some examples may also be combined in other examples.

According to the descriptions in the foregoing implementations, a person skilled in the art may clearly learn that the method in the above embodiments may be implemented by relying on software and a commodity hardware platform or by using hardware. In some embodiments, the technical solutions of this application entirely, or the part contributing to the related art, may be presented in the form of a computer software product. The computer software product is stored in a storage medium (such as, an ROM/RAM, a magnetic disk, and an optical disc) including several instructions to enable a terminal (which may be a mobile phone, a computer, a server, an air conditioner, a network device, or the like) to perform the method described in the embodiments of this application.

The embodiments of this application have been described above with reference to the accompanying drawings. This application is not limited to the implementations described above, and the implementations described above are merely schematic and not limitative. A person ordinarily skilled in the art may make various variations under the teaching of this application without departing from the spirit of this application and the protection scope of the claims, and such variations shall all fall within the protection scope of this application.

What is claimed is:

1. An information determination method, comprising:
acquiring third information by a terminal; and
determining, by the terminal, an actually sent Synchronization Signal and PBCH Block (SSB) according to the third information,
wherein the third information comprises a second indication field that indicates whether candidate SSB groups are actually sent,
wherein an actually sent candidate SSB index set is: $\{(i-1)*M, (i-1)*M+1, \ldots, i*M-1\}, \{(i-1)*M+Q*Y, (i-1)*M+1+Q*Y, \ldots, i*M-1+Q*Y\}, \ldots, \{(i-1)*M+b*Q*Y, (i-1)*M+1+b*Q*Y, \ldots, i-1)*M+1b*Q*Y, \ldots, i*M-1+b*Q*Y\}$, and
wherein each candidate SSB group contains or at most contains M candidate SSBs,
the second indication field has NI bits, NI is an integer greater than or equal to 0,
an $i^{th}$ bit in the N1 bits is a first numerical value, and the first numerical value is used for indicating that the candidate SSB group indicated by the $i^{th}$ bit is actually sent,
Q is a value of a Quasi Co-Location (QCL) parameter,
a QCL relationship of every Y successive candidate SSBs starting from an initial index is the same,
M is an integer greater than or equal to 1, b is a maximum integer that meets a condition of $i*M-1+b*Q*Y <=L-1$,
L is the number of the candidate SSBs, and
i is an integer greater than or equal to 1.

2. The information determination method according to claim 1, wherein:

the SSB position indication field further comprises a third indication field that indicates actually sent candidate SSBs in each candidate SSB group, the second indication field has N1 bits, the third indication field has N2 bits, the number of the candidate SSB groups is N3, wherein N2 is an integer greater than or equal to 0, and N3 is an integer greater than or equal to 1.

3. The information determination method according to claim 1, wherein:

a candidate SSB set indicated by the DBTW configuration comprises all candidate SSBs from a candidate SSB index a to a candidate SSB index a+D, and a is an integer greater than or equal to 0, and D is an integer greater than or equal to 1.

4. The information determination method according to claim 2, wherein effective bits in the N1 bits are determined according to the value of Q or the DBTW configuration.

5. The information determination method according to claim 2, wherein effective bits in the N1 bits are a plurality of successive bits at preset positions.

6. The information determination method according to claim 2, wherein at least one of N1, N2, N3 or M is determined according to the value of Q or the DBTW configuration.

7. The information determination method according to claim 6, wherein N1 and N2 are predefined values, M is calculated according to the value of Q and N1, and M values at preset positions in the N2 bits are effective values.

8. The information determination method according to claim 7, wherein M is calculated by adopting any one of following formulas:

$$M=Q/N_1 \qquad \text{formula 1,}$$

$$M=\lfloor Q/N_1 \rfloor \qquad \text{formula 2, or}$$

$$M=\lceil Q/N_1 \rceil \qquad \text{formula 3,}$$

wherein / represents a division sign, $\lceil \ \rceil$ represents an upward rounding symbol, and $\lfloor \ \rfloor$ represents a downward rounding symbol.

9. The information determination method according to claim 6, wherein:

N1 is determined according to the value of Q and at least one of the following:

a predefined corresponding relationship between a value of Q and N1; or a preset function relationship between a value of Q and N1, wherein when the value of Q is less than or equal to a first threshold, N1 is equal to a second numerical value, or when the value of Q is greater than the first threshold, N1 is determined through the predefined corresponding relationship between the value of Q and N1, or the preset function relationship between the value of Q and N1;

or

N2 is determined according to the value of Q and at least one of the following:

a predefined corresponding relationship between a value of Q and N2, or a preset function relationship between a value of Q and N2, wherein when the value of Q is less than or equal to a second threshold, N2 is equal to a third numerical value, or when the value of Q is greater than the second threshold, N2 is determined through the predefined corresponding relationship between the value of Q and N2, or the preset function relationship between the value of Q and N2, or M is determined according to the value of Q and at least one of the following:

a predefined corresponding relationship between a value of Q and M, or a preset function relationship between a value of Q and M, wherein when the value of Q is less than or equal to a third threshold, M is equal to a fourth numerical value, o, wherein the value of Q is greater than the third threshold, M is determined through the predefined corresponding relationship between the value of Q and M, or the preset function relationship between the value of Q and M.

10. A terminal, comprising a processor; a memory having a computer program or an instruction stored thereon, wherein the computer program or the instruction, when executed by the processor, causes the processor to implement operations, comprising:

acquiring third information; and determining an actually sent Synchronization Signal and PBCH Block (SSB) according to the third information, wherein the third information comprises a second indication field that indicates whether candidate SSB groups are actually sent, wherein an actually sent candidate SSB index set is: $\{(i-1)*M, (i-1)*M+1, \ldots, i*M-1\}, \{(i-1)*M+Q*Y, (i-1)*M+1+Q*Y, \ldots, i*M-1+Q*Y\}, \ldots, \{(i-1)*M+b*Q*Y, (i-1)*M+1+b*Q*Y, \ldots, i-1)*M+1b*Q*Y, \ldots, i*M-1+b*Q*Y\}$, wherein each candidate SSB group contains or at most contains M candidate SSBs, the second indication field has N1 bits, N1 is an integer greater than or equal to 0, an $i^{th}$ bit in the N1 bits is a first numerical value, and the first numerical value is used for indicating that the candidate SSB group indicated by the $i^{th}$ bit is actually sent, Q is a value of a Quasi Co-Location (QCL) parameter, a QCL relationship of every Y successive candidate SSBs starting from an initial index is the same, M is an integer greater than or equal to 1, b is a maximum integer that meets a condition of i*M−1+b*Q*Y<=L−1, L is the number of the candidate SSBs, and i is an integer greater than or equal to 1.

11. The terminal according to claim 10, wherein:

the SSB position indication field further comprises a third indication field that indicates actually sent candidate SSBs in each candidate SSB group, the second indication field has N1 bits, the third indication field has N2 bits, the number of the candidate SSB groups is N3, and wherein N2 is an integer greater than or equal to 0, and N3 is an integer greater than or equal to 1.

12. The terminal according to claim 10, wherein:

a candidate SSB set indicated by the DBTW configuration comprises all candidate SSBs from a candidate SSB index a to a candidate SSB index a+D, and a is an integer greater than or equal to 0, and D is an integer greater than or equal to 1.

13. The terminal according to claim 11, wherein effective bits in the N1 bits are determined according to the value of Q or the DBTW configuration.

14. The terminal according to claim 11, wherein effective bits in the N1 bits are a plurality of successive bits at preset positions.

15. The terminal according to claim 11, wherein at least one of N1, N2, N3 or M is determined according to the value of Q or the DBTW configuration.

16. The terminal according to claim 15, wherein N1 and N2 are predefined values, M is calculated according to the value of Q and N1, and M values at preset positions in the N2 bits are effective values.

17. The terminal according to claim 16, wherein M is calculated by adopting any one of following formulas:

$$M=Q/N_1 \qquad \text{formula 1,}$$

$$M=\lfloor Q/N_1 \rfloor \qquad \text{formula 2, or}$$

$$M=\lceil Q/N_1 \rceil \qquad \text{formula 3,}$$

wherein / represents a division sign, $\lceil\ \rceil$ represents an upward rounding symbol, and $\lfloor\ \rfloor$ represents a downward rounding symbol.

18. A non-transitory computer readable storage medium, storing a computer program or an instruction that, when executed by a processor, causes the processor to implement operations, comprising:

acquiring third information; and determining an actually sent Synchronization Signal and PBCH Block (SSB) according to the third information, wherein the third information comprises a value of a Quasi Co-Location (QCL) parameter Q, and a second indication field that indicates whether candidate SSB groups are actually sent, wherein an actually sent candidate SSB index set is: $\{(i-1)*M, (i-1)*M+1, \dots, i*M-1\}$, $\{(i-1)*M+Q*Y, (i-1)*M+1+Q*Y, \dots, i*M-1+Q*Y\}$, …, $\{(i-1)*M+b*Q*Y, (i-1)*M+1+b*Q*Y, \dots, i-1)*M+1b*Q*Y, \dots, i*M-1+b*Q*Y\}$, wherein each candidate SSB group contains or at most contains M candidate SSBs, the second indication field has N1 bits, N1 is an integer greater than or equal to 0, Q is a value of a Quasi Co-Location (QCL) parameter, an $i^{th}$ bit in the N1 bits is a first numerical value, and the first numerical value is used for indicating that the candidate SSB group indicated by the $i^{th}$ bit is actually sent, a QCL relationship of every Y successive candidate SSBs starting from an initial index is the same, M is an integer greater than or equal to 1, b is a maximum integer that meets a condition of $i*M-1+b*Q*Y<32$ L−1, L is the number of the candidate SSBs, and i is an integer greater than or equal to 1.

\*    \*    \*    \*    \*